H. R. SETZ.
FUEL PUMP FOR INTERNAL COMBUSTION ENGINES.
APPLICATION FILED DEC. 9, 1912.
1,076,915.
Patented Oct. 28, 1913.
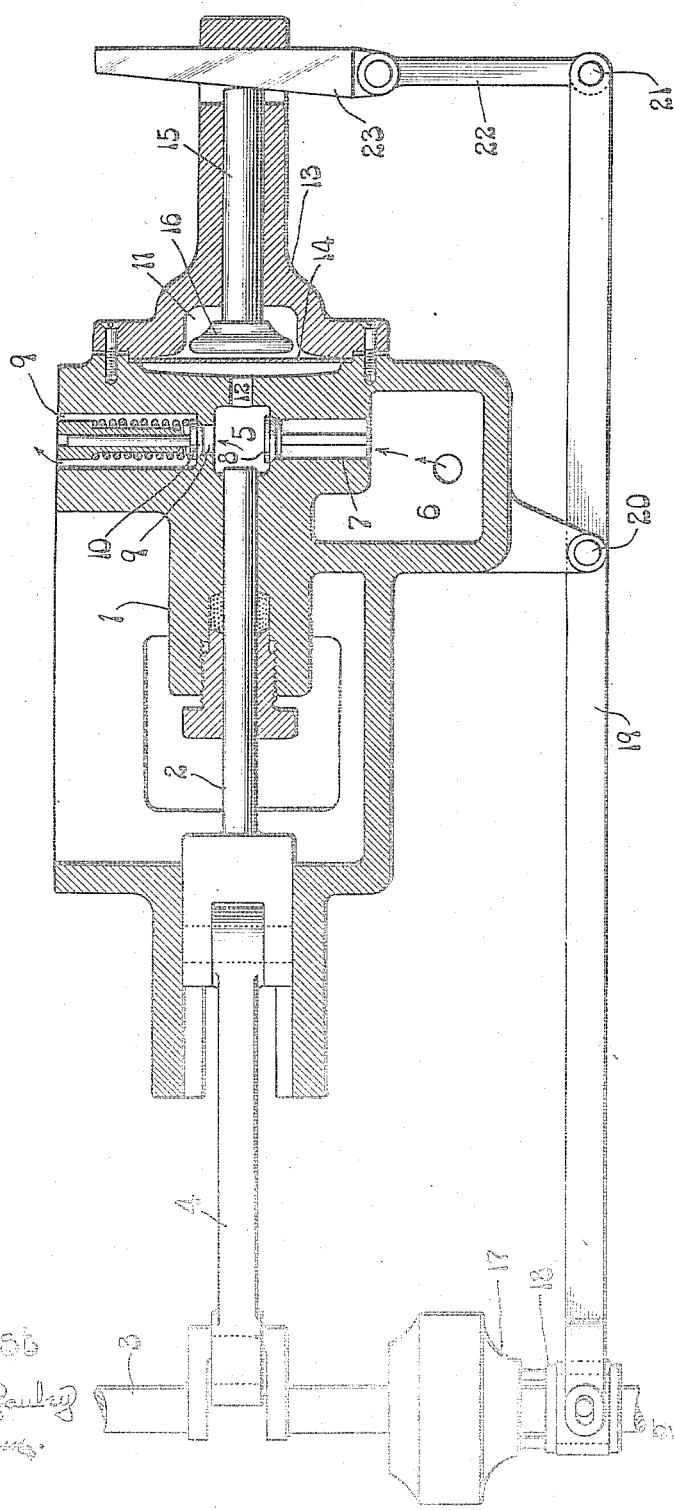

UNITED STATES PATENT OFFICE.

HANS R. SETZ, OF ST. LOUIS, MISSOURI, ASSIGNOR TO FULTON IRON WORKS, OF ST. LOUIS, MISSOURI, A CORPORATION.

FUEL-PUMP FOR INTERNAL-COMBUSTION ENGINES.

1,076,915.

Specification of Letters Patent.

Patented Oct. 28, 1913.

Application filed December 9, 1912. Serial No. 735,660.

*To all whom it may concern:*

Be it known that I, HANS R. SETZ, a citizen of the Republic of Switzerland, and a resident of the city of St. Louis and State of Missouri, in the United States of America, have invented certain new and useful Improvements in Fuel-Pumps for Internal-Combustion Engines, of which the following is a full, clear, and exact description, reference being had to the accompanying drawing, forming a part of this specification.

My invention relates to a pump for delivering oil or other liquid fuel to the combustion chamber of an internal combustion engine, for instance of the "Diesel" type, and it has for its object the production of a novel pump of this kind by which the oil may be delivered to the combustion chamber in an economical manner, due to variation in the capacity of the measuring chamber of the pump according to the changes in load imposed on the engine and the speed of the engine.

The accompanying drawing is in part a longitudinal section, and in part an elevation of my pump.

In the drawings: 1 designates the pump cylinder and 2 a plunger operable in said cylinder. The plunger 2 is designed to be driven by a crank shaft 3 that enters into the structure of an internal combustion engine, and between which and said plunger is a connecting rod 4.

Within the pump cylinder 1 is a measuring chamber 5 into which the plunger 2 is adapted to operate. This measuring chamber is designed to receive a supply of liquid fuel, for instance, oil, and the fuel received by the chamber is intended to be forced therefrom to the cylinder of an internal combustion engine. The measuring chamber 5 of the pump cylinder receives liquid fuel from an inlet chamber 6 adjoining the pump chamber, between which and said pump chamber is a delivery duct 7 controlled by a suction valve 8, the liquid fuel being conducted into the inlet chamber 6 from any suitable source of supply, and drawn to the measuring chamber 5 during rearward strokes of the plunger 2, and the automatic opening of the suction valve 8. The liquid fuel is forced from the measuring chamber 5 through the duct 9 that is controlled by an induction valve 10, and is adapted to be arranged in communication with the cylinder of an internal combustion engine of a common type.

Adjacent to the measuring chamber 5 in the cylinder 1 of my pump is a diaphragm chamber 11 that has communication with the measuring chamber through a port 12 that permits the liquid fuel entering into the measuring chamber to pass therefrom into said diaphragm chamber. The diaphragm chamber 11, as herein shown, is produced by a chambered member 13 secured to the cylinder 1, but may be produced in any other suitable manner. In said diaphragm chamber is a diaphragm 14 that is arranged in opposition to the plunger 2, and is adapted to be deflected by pressure of liquid fuel thereagainst incident to force exerted against the fuel in the measuring chamber 5 by the plunger 2, thereby enlarging the space for the liquid fuel that becomes confined between the inlet and eduction valves 8 and 10 of my pump. Deflection of the diaphragm 14 is regulated by controlling means comprising the following elements: 15 is a movable abutment having a head 16 located back of the diaphragm 14, in opposition to the plunger 2. This movable abutment is adapted to be moved forwardly relative to the diaphragm and the opposing plunger 2 through the medium of a governor 17, coöperable with the shaft 3 by which the plunger 2 is driven, which governor may be of any suitable construction. In the construction herein illustrated, the governor includes a sleeve 18 slidable longitudinally of the shaft 3, and said sleeve has connected to it a lever 19 that is pivotally supported at 20. The arm of the lever 19 farthest from the governor sleeve 18 has pivoted to it at 21 a link 22 to which is connected a wedge 23, which is operable against the outer end of the movable abutment 15.

In the practical use of my pump, liquid fuel is drawn to the measuring chamber 5 of the pump cylinder 1 during the return strokes of the pump plunger 2, and the consequent opening of the suction valve 8. The liquid fuel is forced from said measuring chamber upon the forward strokes of the pump plunger 2 and the opening of the eduction valve 10, consequent to sufficient pressure exerted against the fuel by the pump plunger.

When the pump is operating under a norman load, or less than a normal load, the movable abutment 15 remains stationary, or substantially stationary, back of the diaphragm 14 and separated therefrom, as indicated in the drawing. Consequently, the force against liquid fuel in the measuring chamber 5 created by the forward strokes of the pump plunger 2 to force the liquid fuel from the measuring chamber through the eduction duct 9 acts to deflect the diaphragm 14, and the capacity of the measuring chamber is increased, according to the degree of deflection of said diaphragm. Under normal operation of an engine supplied with liquid fuel by my pump, the diaphragm 14 is deflected to a corresponding degree upon each forward stroke of the plunger 2 and, therefore, a uniform delivery of liquid fuel is discharged from the pump to the combustion chamber of the engine. When, however, the speed of the engine becomes greater, or the load upon the engine becomes greater, necessitating a greater supply of liquid fuel to the combustion chamber, the quantity of liquid fuel discharged from the measuring chamber is increased by limiting or preventing the deflection of the diaphragm 14, due to liquid fuel pressure thereagainst, so that the liquid fuel will be confined within a space comprising the measuring chamber, that is not susceptible of the enlargement incident to the deflection of the diaphragm 14 that occurs when the pump is operating under normal conditions. When the greater supply of liquid fuel is required, the movable abutment 15 is automatically advanced toward the diaphragm 14 by virtue of its being actuated by the governor 17. This movement is accomplished by the governor sleeve 18 acting upon the lever 19 fitted thereto, thereby imparting movement to the wedge 23 and causing the latter member to adjust the abutment 15 toward the diaphragm 14. The said diaphragm is then limited in deflection or prevented from deflection by coming into contact with the head of the abutment when pressure is exerted thereagainst by liquid fuel acted upon by the pump plunger 2, and the desired increased discharge of liquid fuel from the measuring chamber of the pump is derived.

The diaphragm 14 is herein shown and described as being located in a chamber separate from the measuring chamber 5, but it is obvious that such diaphragm might be located directly in such measuring chamber without departing from my invention.

It is to be understood in this connection that the entire space between the pump plunger 2 and the diaphragm 14 is included in the measuring chamber of the pump, irrespective of the use herein of separate terms to indicate the measuring chamber and the diaphragm chamber. I will also add that other governor operated means than the wedge 23 might be utilized for imparting movement to the movable abutment 15, and that said removable abutment may be of other forms than that shown; and I therefore do not limit myself to the details of construction shown and described relative to these parts.

I claim:—

1. A fuel feed pump for internal combustion engines, comprising a cylinder having a measuring chamber, means operable to force liquid fuel from said measuring chamber, a diaphragm determining the capacity of said measuring chamber deflectable by pressure exerted against liquid fuel in said measuring chamber, an engine governor, and means operable by said engine governor whereby deflection of said diaphragm is prevented or controlled.

2. A fuel feed pump for internal combustion engines comprising a cylinder having a measuring chamber therein adapted to receive liquid fuel, a plunger operable to force liquid fuel from said measuring chamber, a diaphragm deflectable by pressure exerted by said plunger against liquid fuel in said measuring chamber, an engine governor, and an adjustable abutment operable by said engine governor whereby the degree of deflection of said diaphragm is controlled.

3. A fuel feed pump for internal combustion engines, comprising a cylinder having a measuring chamber formed with an opening, a yieldable diaphragm closing said opening, means operable to force liquid fuel through said measuring chamber, an engine governor, and means operable by said engine governor for limiting the movement of said diaphragm.

4. A fuel feed pump for internal combustion engines, comprising a cylinder having a measuring chamber, means operable to force liquid fuel from said measuring chamber, a yieldable member determining the capacity of said measuring chamber deflectable by pressure exerted against liquid fuel in said measuring chamber, an engine governor, and means operable by said engine governor whereby deflection of said yieldable member is prevented or controlled.

H. R. SETZ.

In the presence of—
E. B. LINN,
A. J. MCCAULEY.